(12) United States Patent
Li

(10) Patent No.: US 12,477,619 B2
(45) Date of Patent: Nov. 18, 2025

(54) SHORT CYCLE CONFIGURATION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 600 days.

(21) Appl. No.: 17/780,964

(22) PCT Filed: Nov. 29, 2019

(86) PCT No.: PCT/CN2019/122158
§ 371 (c)(1),
(2) Date: May 27, 2022

(87) PCT Pub. No.: WO2021/102990
PCT Pub. Date: Jun. 3, 2021

(65) Prior Publication Data
US 2023/0007725 A1    Jan. 5, 2023

(51) Int. Cl.
*H04W 76/28*   (2018.01)
*H04W 24/02*   (2009.01)
*H04W 72/121*  (2023.01)
*H04W 76/38*   (2018.01)

(52) U.S. Cl.
CPC .......... *H04W 76/28* (2018.02); *H04W 24/02* (2013.01); *H04W 72/121* (2013.01); *H04W 76/38* (2018.02)

(58) Field of Classification Search
CPC ... H04W 24/02; H04W 72/121; H04W 76/28; H04W 76/38
See application file for complete search history.

(56) References Cited

U.S. PATENT DOCUMENTS

| | | |
|---|---|---|
| 2009/0232054 A1* | 9/2009 | Wang ............ H04W 76/28 370/328 |
| 2009/0238098 A1 | 9/2009 | Cai et al. |
| 2010/0144299 A1 | 6/2010 | Ren |
| 2011/0002281 A1* | 1/2011 | Terry ............ H04W 76/28 370/329 |

(Continued)

FOREIGN PATENT DOCUMENTS

| | | |
|---|---|---|
| CN | 102143565 A | 8/2011 |
| CN | 102595568 A | 7/2012 |

(Continued)

OTHER PUBLICATIONS

International Search Report of PCT/CN2019/122158 dated Aug. 26, 2020 with English translation, (4p).

(Continued)

*Primary Examiner* — Andrew Lee
(74) *Attorney, Agent, or Firm* — Arch & Lake LLP

(57) ABSTRACT

A short cycle configuration method The method includes: for a plurality of discontinuous reception (DRX) groups of a user equipment, configuring, by a base station, a DRX short cycle parameter of the DRX group for a first frequency band and/or the DRX group for a second frequency band; where a frequency of the first frequency band is higher than a frequency of the second frequency band.

16 Claims, 5 Drawing Sheets

| BASE STATION | USER EQUIPMENT |
|---|---|
| 101:FOR MULTIPLE DISCONTINUOUS RECEPTION (DRX) GROUPS OF THE USER EQUIPMENT, CONFIGURE A DRX SHORT CYCLE PARAMETER OF A FIRST FREQUENCY BAND DRX GROUP AND/OR A SECOND FREQUENCY BAND DRX GROUP, THE FREQUENCY OF THE FIRST FREQUENCY BAND BEING GREATER THAN THE FREQUENCY OF THE SECOND FREQUENCY BAND | |

(56) References Cited

U.S. PATENT DOCUMENTS

| | | | |
|---|---|---|---|
| 2012/0002635 A1 | 1/2012 | Chung et al. | |
| 2013/0294313 A1 | 11/2013 | Han | |
| 2014/0269480 A1 | 9/2014 | Han | |
| 2015/0131505 A1 | 5/2015 | Dai | |
| 2015/0215868 A1* | 7/2015 | Xu | H04W 76/28 370/311 |
| 2015/0359035 A1 | 12/2015 | Lee et al. | |
| 2016/0081020 A1 | 3/2016 | Rahman et al. | |
| 2017/0171768 A1 | 6/2017 | Kim et al. | |
| 2018/0070309 A1 | 3/2018 | Yamada et al. | |
| 2019/0215896 A1 | 7/2019 | Zhou et al. | |
| 2019/0293772 A1* | 9/2019 | Pfeiffer | G05D 1/0088 |
| 2021/0105780 A1* | 4/2021 | Jin | H04L 5/0098 |
| 2021/0105857 A1* | 4/2021 | He | H04W 80/02 |
| 2021/0289441 A1* | 9/2021 | Li | H04W 52/0229 |

FOREIGN PATENT DOCUMENTS

| | | |
|---|---|---|
| CN | 103139920 A | 6/2013 |
| CN | 108200640 A | 6/2018 |
| CN | 108377551 A | 8/2018 |
| CN | 109769309 A | 5/2019 |
| CN | 110352616 A | 10/2019 |
| TW | 201707478 A | 2/2017 |
| WO | 2008111684 A1 | 9/2008 |
| WO | 2010013942 A2 | 2/2010 |
| WO | 2012097690 A1 | 7/2012 |

OTHER PUBLICATIONS

The First CNOA of Application No. 201980003249.9, dated on Oct. 28, 2022,(7p).

The First CNOA of Application No. 201980003249.9, dated on Nov. 28, 2022,(7p).

Samsung. "C-DRX for Nr",3GPP TSG-RAN WG2 Meeting #95,R2-165187, Gothenburg, Sweden, Aug. 22-26, 2016,(3p).

Qualcomm Inc., R5, "Correction to 5GS MAC Test case 7.1.1.5.3 DRX operation / Short cycle configured / Parameters configured by RRC," 3GPP TSG-RAN WG5 Meeting #80, R5-185066, Gothenburg, Sweden, Aug. 20-24, 2018, (10p).

Ericsson, R2, "Introduction of secondary DRX group," 3GPP TSG-RAN2 Meeting #108, R2-1915290, Reno, USA, Nov. 18-22, 2019, (4p).

Nokia Siemens Networks, et al., "DRX in Carrier Aggregation—Active Time," 3GPP TSG-RAN WG2 Meeting #69, R2-101527, San Francisco, U.S.A., Feb. 22-26, 2010, (4p).

CNOA issued in Application No. 201980003249.9 dated Jul. 26, 2023 with English translation, (11p).

* cited by examiner

SHORT CYCLE CONFIGURATION METHOD AND APPARATUS, COMMUNICATION DEVICE, AND STORAGE MEDIUM

CROSS-REFERENCE TO RELATED APPLICATION

The application is a U.S. National Stage of International Application No. PCT/CN2019/122158 filed on Nov. 29, 2019, the entire content of which is incorporated herein by reference for all purposes.

TECHNICAL FIELD

The present application relates to the field of wireless communication technologies, but is not limited to the field of wireless communication technologies, and in particular, relates to a method, apparatus for configuring a short cycle, a communication device, and a storage medium.

BACKGROUND

In order to meet the requirements of single-user peak rate and system capacity improvement, the characteristic of Carrier Aggregation (CA) was introduced in the R10 version of Long Term Evolution (LTE). The carrier aggregation includes: continuous carrier aggregation and non-continuous carrier aggregation. For the continuous carrier aggregation, the terminal only needs one transceiver; while for different bandwidths of the non-continuous carrier aggregation, different radio frequency (RF) chains are required. Different Discontinuous Reception (DRX) groups may be set according to different RF chains used by the user equipment.

SUMMARY

The present disclosure provides a method and apparatus for configuring a short cycle, a communication device, and a storage medium.

According to a first aspect of the present disclosure, there is provided a method for configuring a short cycle, applied to a base station, and the method includes:
for a plurality of discontinuous reception (DRX) groups of a user equipment, configuring a DRX short cycle parameter of the DRX group for a first frequency band and/or the DRX group for a second frequency band;
where a frequency of the first frequency band is higher than a frequency of the second frequency band.

According to a second aspect of the present disclosure, there is provided a method for configuring a short cycle, applied to a user equipment, the method includes:
obtaining a discontinuous reception (DRX) short cycle parameter of a DRX group for a first frequency band and/or a DRX group for a second frequency band configured by a base station;
where a frequency of the first frequency band is higher than a frequency of the second frequency band.

According to a third aspect of the present disclosure, there is provided an apparatus for configuring a short cycle, applied to a base station, and the apparatus includes: a processor, a transceiver, a memory, and an executable program stored on the memory and capable of being run by the processor, wherein the processor, when running the executable program, executes:
for a plurality of discontinuous reception (DRX) groups of a user equipment, configuring a DRX short cycle parameter of the DRX group for a first frequency band and/or the DRX group for a second frequency band;

It is to be understood that both the foregoing general description and the following detailed description are exemplary and explanatory only and are not restrictive of the embodiments of the present disclosure.

BRIEF DESCRIPTION OF THE DRAWINGS

The accompanying drawings, which are incorporated in and constitute a part of this specification, illustrate embodiments consistent with the embodiments of the present disclosure and, together with the description, serve to explain the principles of the embodiments of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

The terms used in the examples of the present disclosure are only for the purpose of describing specific examples, and are not intended to limit the examples of the present disclosure. The singular forms of "a", "an" and "the" used in the examples of the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used to describe various information in the examples of the present disclosure, the information should not be limited to these terms. These terms are only used to distinguish the same type of information from each other. For example, without departing from the scope of the examples of the present disclosure, the first information may also be referred to as second information, and similarly, the second information may also be referred to as first information. Depending on the context, the words "if" as used herein can be interpreted as "when" or "while" or "in response to determination that . . . ".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
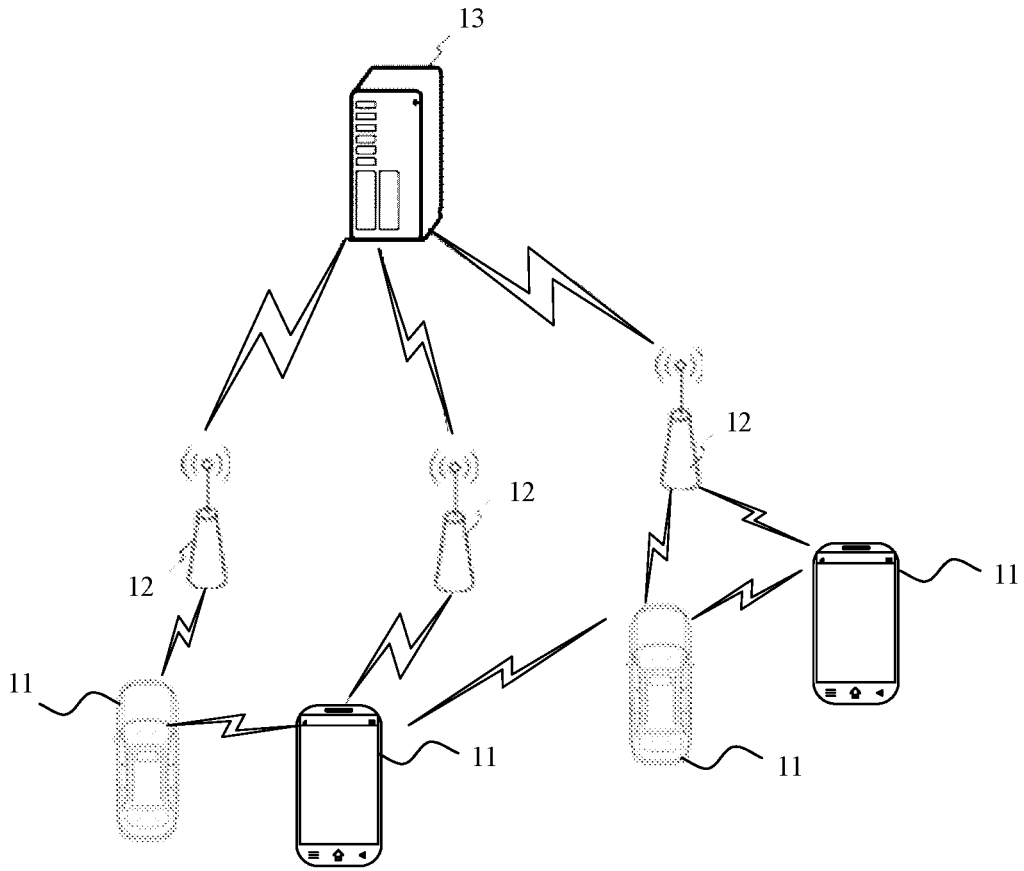
FIG. 1 is a schematic structural diagram of a wireless communication system according to an example.

FIG. 1 shows a schematic structural diagram of a wireless communication system provided by an example of the present disclosure. As shown in FIG. 1, the wireless communication system is a communication system based on cellular mobile communication technology, and the wireless communication system may include: several terminals 11 and several base stations 12.

The terminal 11 may be a device that provides voice and/or data connectivity to the user. The terminal 11 may communicate with one or more core networks via a Radio Access Network (RAN). The terminal 11 may be an Internet of things (IoT) terminal such as a sensor device, a mobile phone (or "cellular" phone), and a computer having the IoT terminal, for example, it may be a fixed, portable, pocket, hand-held, computer built-in or a vehicle-mounted apparatus, such as a Station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, a street light, a signal light, or other roadside devices with a wireless communication function.

The base station 12 may be a network-side device in the wireless communication system. The wireless communication system may be the $4^{th}$ generation mobile communication (4G) system, also known as a Long Term Evolution (LTE) system; or, the wireless communication system may also be a 5G system, also known as new radio (NR) system or 5G NR system. Alternatively, the wireless communication system may also be a next-generation system of the 5G system. Among them, the access network in the 5G system may be called New Generation-Radio Access Network (NG-RAN), or, the MTC system.

The base station 12 may be an evolved base station (eNB) used in the 4G system. Alternatively, the base station 12 may also be a base station (gNB) that adopts a centralized and distributed architecture in the 5G system. When the base station 12 adopts the centralized and distributed architecture, it usually includes a central unit (CU) and at least two distributed units (DUs). The central unit is provided with protocol stacks of a Packet Data Convergence Protocol (PDCP) layer, a radio link layer control protocol (Radio Link Control, RLC) layer, and a Media Access Control (MAC) layer. The distributed unit is provided with a Physical (PHY) layer protocol stack. The examples of the present disclosure do not limit the specific implementation manner of the base station 12.

A wireless connection may be established between the base station 12 and the terminal 11 through a wireless air interface. In different implementations, the wireless air interface is a wireless air interface based on the $4^{th}$ generation mobile communication network technology (4G) standard; or, the wireless air interface is a wireless air interface based on the $5^{th}$ generation mobile communication network technology (5G) standard, for example, the wireless air interface is a new air interface; or, the wireless air interface may also be a wireless air interface based on a 5G-based next-generation mobile communication network technology standard.

In some examples, an End to End (E2E) connection may also be established between the terminals 11, for example, vehicle to vehicle (V2V) communication, vehicle to Infrastructure (V2I) communication and vehicle to pedestrian (V2P) communication in vehicle to everything (V2X) communication and other scenes.

In some examples, the above-mentioned wireless communication system may further include a network management device 13.

Several base stations 12 are respectively connected to the network management device 13. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or Home Subscriber Server (HSS), etc. The implementation form of the network management device 13 is not limited in the examples of the present disclosure.

The execution subjects involved in the examples of the present disclosure include, but are not limited to, user equipment and base station that communicate using the carrier aggregation technology.

An application scenario of the examples of the present disclosure is that different DRX Groups may use different DRX parameters, for example, use different duration timers (onDurationTimer) and inactivity timers (drx-InactivityTimer). The duration timers are aligned. Different DRX groups may use different DRX short cycle parameters, such as DRX short cycle (shortDRX-Cycle) and DRX short cycle timer (drx-ShortCycleTimer). Generally, DRX group 1 corresponds to a Frequency Range (FR) 1, and DRX group 2 corresponds to FR2, that is, they are used for low frequency band and high frequency band respectively. According to the frequency ranges of the fifth generation (5G) cellular mobile communication technology defined by the $3^{rd}$ Generation Partnership Project (3GPP), FR1 is: 450 MHz-6000 MHz, and FR2 is: 24250 MHz-52600 MHz. Because of the higher speed in the high frequency band, the data of the same amount of data is transmitted faster in FR2. In the related art, there is no provision for separately configuring the DRX short cycle parameter of DRX group 1 and the DRX short cycle parameter of DRX group 2.

Figure 2:
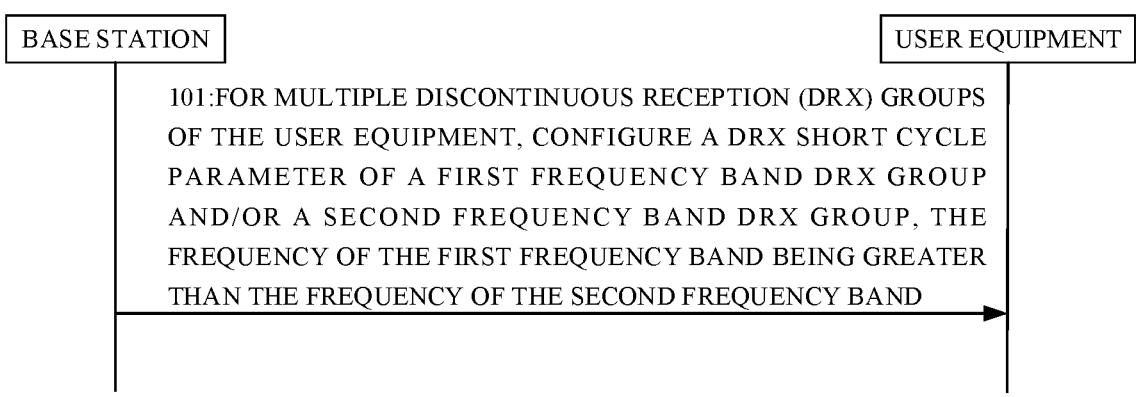
FIG. 2 is a schematic flowchart of a method for configuring a short cycle according to an example.

As shown in FIG. 2, this example provides a method for configuring a short cycle, which may be applied to a base station of wireless communication, and the method includes the following steps.

In step 101: for a plurality of DRX groups of the user equipment, a DRX short cycle parameter of a DRX group for a first frequency band and/or a DRX group for a second frequency band is configured; where a frequency of the first frequency band is higher than a frequency of the second frequency band.

The DRX short cycle parameter may include any parameters related to the DRX short cycle of the DRX group, for example, including: a parameter indicating whether to configure the DRX short cycle, a parameter of how to configure the DRX short cycle, and/or an effective range parameter of the DRX short cycle, etc. For example, the DRX short cycle parameter may be used to configure parameters of attributes of the DRX short cycle such as a duration of the DRX short cycle and a duration time of the DRX short cycle. The DRX short cycle parameter may include: a DRX short cycle timer duration and/or a DRX short cycle, and the like.

Figure 3:
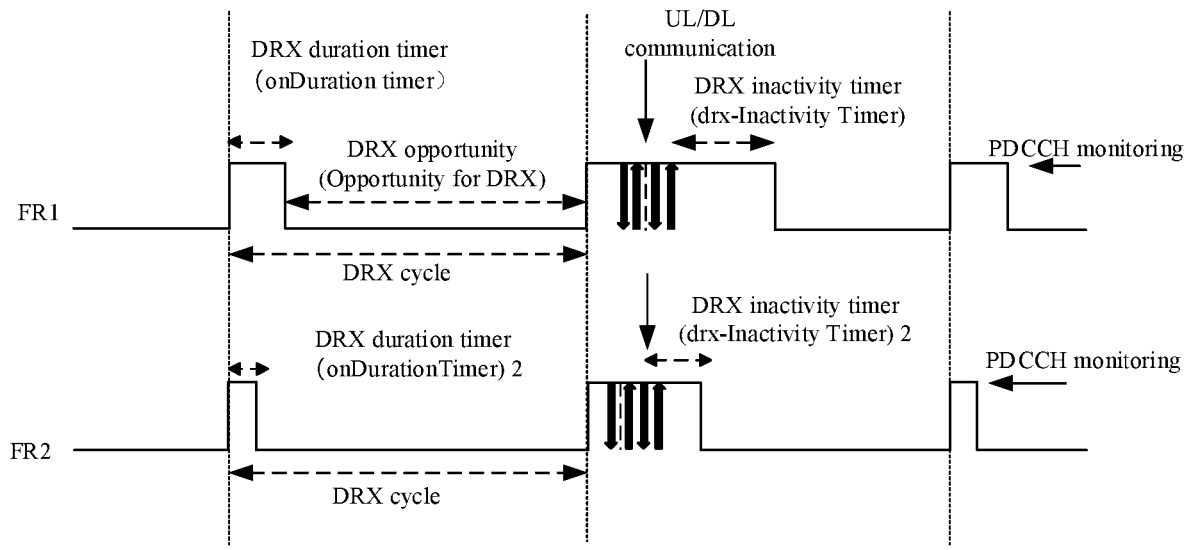
FIG. 3 is a schematic diagram of a DRX cycle shown according to an example.

The base station may configure the DRX short cycle parameter for the user equipment in the RRC connected state through Radio Resource Control (RRC) signaling, and the user equipment obtains the DRX short cycle parameter to determine the configuration of the DRX short cycle. As shown in FIG. 3, one DRX cycle may be composed of a duration part of a duration timer (onDurationTimer) and a duration part of a DRX opportunity (Opportunity for DRX). During the duration of the duration timer, the user equipment monitors and receives the Physical Downlink Control Channel (PDCCH). During the duration of the DRX opportunity, the user equipment no longer monitors the PDCCH to reduce power consumption. The DRX cycle may include: a DRX short cycle (ShortDRX-Cycle) and a DRX long cycle (longDRX-Cycle). Among them, the DRX long cycle is longer than the DRX short cycle. Both the DRX short cycle and the DRX long cycle belong to the DRX cycle configured for the DRX group.

Generally, the DRX short cycle is an optional configuration. When the DRX short cycle is configured for the user equipment, the user equipment may start the DRX short cycle timer (Drx-ShortCycleTimer) when using the DRX short cycle. When the DRX short cycle timer expires, it switches to the DRX long cycle. At this time, the DRX short cycle timer is equivalent to limiting the action time range of the DRX short cycle.

The DRX group for the first frequency band may be a DRX group belonging to the frequency band range FR2. The DRX group for the second frequency band may be a DRX group belonging to a Frequency Range (FR) 1. Among them, FR2 is higher than FR1. For example, FR1 may be: 450 MHz-6000 MHz, and FR2 may be: 24250 MHz-52600 MHz.

In this way, different DRX short cycle parameters are set for DRX groups of different frequency bands, which improves the flexibility of setting the DRX short cycle parameter.

In an example, step 101 includes: configuring a DRX short cycle timer duration of the DRX group for the first frequency band to be less than or equal to a DRX short cycle timer duration of the DRX group for the second frequency band; and/or, configuring a DRX short cycle of the DRX group for the first frequency band to be greater than or equal to a DRX short cycle of the DRX group for the second frequency band.

Because the DRX group for the first frequency band of higher frequency band has a higher data transmission rate than the DRX group for the second frequency band of lower frequency band, the time required to transmit the same data is shorter, and the time required for the DRX group for the first frequency band to monitor the PDCCH is shorter. Therefore, the monitoring duration when the DRX group for the first frequency band is in the DRX short cycle may be configured to be less than or equal to the monitoring duration when the DRX group for the second frequency band is in the DRX short cycle.

Figure 4:
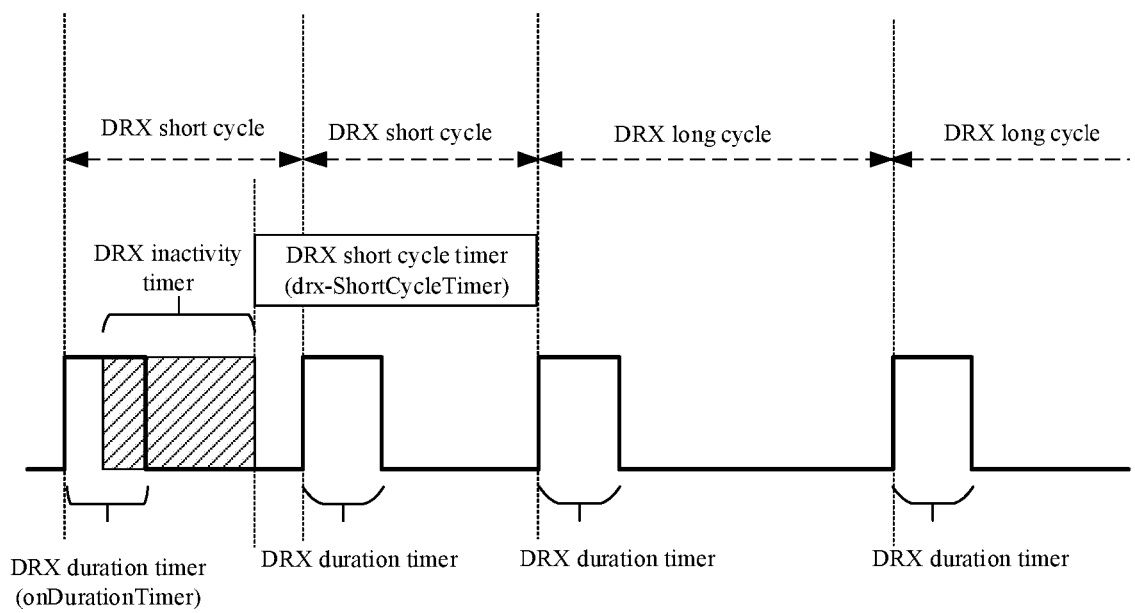
FIG. 4 is a schematic diagram of another DRX cycle shown according to an example.

For the DRX short cycle timer, as shown in FIG. 4, when the DRX short cycle timer times out, the effective DRX cycle is switched from the DRX short cycle to the DRX long cycle. If the duration of the duration timer is the same in the DRX short cycle and the DRX long cycle, the duration of the duration timer occupies a small proportion of the time in the DRX long cycle, and the duration of the duration timer occupies a large proportion of the time in the DRX short cycle. The duration of the DRX short cycle can be reduced by reducing the duration of the DRX short cycle timer, thereby reducing the monitoring duration when the DRX group is in the DRX short cycle. The user equipment may determine the duration of the DRX short cycle timer according to the DRX short cycle parameter, and set the DRX short cycle timer for the DRX short cycle according to the duration of the DRX short cycle timer.

The DRX short cycles of the DRX group for the first frequency band and the DRX group for the second frequency band may be the same or different, and the DRX short cycle timer duration of the DRX group for the first frequency band may be configured to be less than or equal to the DRX short cycle timer duration of the DRX group for the second frequency band.

Exemplarily, if the DRX short cycles of the DRX group for the first frequency band and the DRX group for the second frequency band are both 20 ms, the duration of the DRX short cycle timer of the DRX group for the second frequency band may be configured to be 20 ms*6, and the duration of the DRX short cycle timer of the DRX group for the first frequency band may be configured to be 20 ms*4.

Exemplarily, if the DRX short cycle of the DRX group for the second frequency band is 20 ms, and the DRX short cycle of the DRX group for the first frequency band is 40 ms; then the duration of the DRX short cycle timer of the DRX group for the second frequency band may be configured to be 20 ms*6, and the duration of the DRX short cycle timer of the DRX group for the first frequency band may be configured to be 40 ms*3 or 40 ms*1; in this way, the duration of the DRX short cycle timer of the DRX group for the first frequency band is not longer than that of the DRX group for the second frequency band.

In this way, the duration of the DRX short cycle timer of the DRX group for the first frequency band is less than or equal to the duration of the DRX short cycle timer of the DRX group for the second frequency band, so that the number of the DRX short cycles of the DRX group for the first frequency band within the DRX short cycle timer duration is less than or equal to the number of the DRX short cycles of the DRX group for the second frequency band within the DRX short cycle timer duration, thereby reducing the duration time of the DRX short cycle in which the monitoring duration of the DRX group for the first frequency band accounts for a relatively large proportion, and thus saving power consumption of the user equipment.

For the DRX short cycle, as shown in FIG. 4, when the DRX short cycle of the DRX group increases, the number of the DRX short cycle within the same time period decreases, and the monitoring duration of the DRX group decreases. Therefore, the DRX short cycle of the DRX group for the first frequency band may be set to be greater than or equal to the DRX short cycle of the DRX group for the second frequency band. The user equipment may determine the DRX short cycle according to the DRX short cycle parameter.

When the DRX short cycle of the DRX group for the first frequency band is greater than or equal to the DRX short cycle of the DRX group for the second frequency band, the number of DRX short cycles of the DRX group for the first frequency band is less than or equal to that of the DRX short cycles of the DRX group for the second frequency band in the same time period.

In this way, in the first aspect, different DRX short cycle parameters are set for different frequency bands of the DRX group, which improves the flexibility of setting the DRX short cycle parameters. In the second aspect, by configuring a shorter DRX short cycle timer duration for the high-frequency band DRX group, the duration time of the DRX short cycle in which the monitoring duration occupies a relatively large proportion is reduced. In the third aspect, by configuring a relatively large DRX short cycle for high-frequency band DRX group, the proportion of the monitoring duration in the DRX short cycle is reduced. The DRX short cycle parameters are configured from multiple aspects, so that the PDCCH monitoring duration of high-frequency band DRX group is reduced and power of the user equipment is saved.

In an example, step 101 includes: configuring a DRX short cycle for the DRX group for the second frequency band.

Here, the base station may configure the DRX short cycle only for the DRX group for the second frequency band. The duration of the duration timer occupies a larger proportion of time in the DRX short cycle than in the DRX long cycle. Therefore, the DRX short cycle may not be configured for the DRX group for the first frequency band, which can reduce the time proportion of the duration of the duration timer in the entire time domain, thereby reducing the PDCCH monitoring duration of the DRX group for the first frequency band, and thus saving power of the user equipment. The user equipment may determine, according to the DRX short cycle parameter, not to configure the DRX short cycle for the DRX group for the first frequency band.

In this way, the DRX short cycle is not configured for high-frequency band DRX group, and the number of the DRX short cycles with a large monitoring duration is reduced; the PDCCH monitoring duration of high-frequency band DRX group is reduced, and power of the user equipment is saved.

In an example, the duration of the DRX short cycle timer of the DRX group for the first frequency band may be configured to be less than or equal to the duration of the DRX short cycle timer of the DRX group for the second frequency band; and at the same time, the DRX short cycle of the DRX group for the first frequency band may be configured to be greater than or equal to the DRX short cycle of the DRX group for the second frequency band.

In this way, while reducing the duration of the DRX short cycle in which the monitoring duration occupies a relatively large proportion, the proportion of the monitoring duration in the DRX short cycle can be reduced.

In an example, configuring the DRX short cycle of the DRX group for the first frequency band to be greater than or equal to the DRX short cycle of the DRX group for the second frequency band, includes:

configuring the DRX short cycle of the DRX group for the first frequency band to be N times the DRX short cycle of the DRX group for the second frequency band, where N is a positive integer greater than or equal to 1.

For example, in step 101, the DRX short cycle of the DRX group for the first frequency band may be configured to be an integer multiple of the DRX short cycle of the DRX group for the second frequency band. The user equipment may determine the DRX short cycle of the DRX group for the first frequency band and the DRX short cycle of the DRX group for the second frequency band according to the DRX short cycle parameter, and configure the DRX short cycle of the DRX group for the first frequency band to be an integral multiple of the DRX short cycle of the DRX group for the second frequency band.

Exemplarily, if the DRX short cycle of the DRX group for the second frequency band is 20 ms, then the DRX short cycle of the DRX group for the first frequency band may be configured to be 40 ms.

In this way, if the duration of the duration timer is the same, the monitoring duration of the DRX group for the first frequency band in the same time period is less than or equal to the monitoring duration of the DRX group for the second frequency band. In this way, the PDCCH monitoring duration of the high-frequency band DRX group is reduced, and the power of the user equipment is saved.

In an example, the method further includes at least one of the following: sending a first medium access control control unit (MAC CE), where the first MAC CE is used to indicate the DRX group for the first frequency band and the DRX group for the second frequency band to enter the DRX short cycle at the same time or enter the DRX long cycle at the same time; and sending a second MAC CE, where the second MAC CE is used to instruct the DRX group for the second frequency band to enter the DRX short cycle, and the DRX group for the first frequency band to enter the DRX long cycle.

The base station may send an MAC CE through an RRC connection or the like to instruct the user equipment to enter the DRX short cycle or the DRX long cycle.

The first MAC CE may be a CE that acts on both the DRX group for the first frequency band and the DRX group for the second frequency band. When the user equipment receives the first MAC CE, it may switch the DRX group for the first frequency band and the DRX group for the second frequency band to the DRX short cycle at the same time, or switch the DRX group for the first frequency band and the DRX group for the second frequency band to the DRX long cycle at the same time.

The second MAC CE may be a CE that acts on both the DRX group for the first frequency band and the DRX group for the second frequency band. When the user equipment receives the second MAC CE, it may switch the DRX group for the second frequency band to the DRX short cycle, and simultaneously switch the DRX group for the first frequency band to the DRX long cycle.

Figure 5:
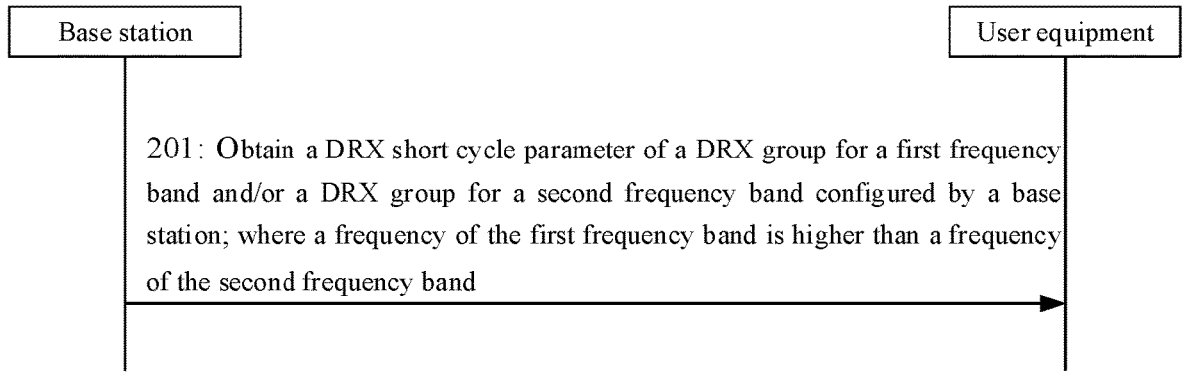
FIG. 5 is a schematic flowchart of another method for configuring a short cycle according to an example.

As shown in FIG. 5, this example provides a method for configuring a short cycle, which may be applied to a user equipment of wireless communication, and the method includes the following steps.

In step 201: a DRX short cycle parameter of a DRX group for a first frequency band and/or a DRX group for a second frequency band configured by a base station is obtained; where a frequency of the first frequency band is higher than a frequency of the second frequency band.

The DRX short cycle parameter may include any parameters related to the DRX short cycle of the DRX group, for example, it may include: a parameter indicating whether to configure the DTX short cycle, a parameter about how to configure the DRX short cycle, and/or an effective range parameter of the DRX short cycle, etc. For example, the DRX short cycle parameter may be used to configure parameters of the DRX short cycle attribute such as the duration of the DRX short cycle and the duration time of the DRX short cycle. The DRX short cycle parameter may include: a DRX short cycle timer duration (duration of the DRX short cycle timer) and/or a DRX short cycle, and the like.

The base station may configure DRX short cycle parameters for the user equipment in the RRC connected state through Radio Resource Control (RRC) signaling, and the user equipment obtains the DRX short cycle parameters to determine the configuration condition of the DRX short cycle. As shown in FIG. 3, one DRX cycle may be composed of a duration part of a duration timer (onDurationTimer) and a duration part of a DRX opportunity (Opportunity for DRX). During the duration of the duration timer, the user equipment monitors and receives the Physical Downlink Control Channel (PDCCH). During the duration of the DRX opportunity, the user equipment no longer monitors the PDCCH to reduce power consumption. The DRX cycle may include: a DRX short cycle (ShortDRX-Cycle) and a DRX long cycle (longDRX-Cycle). The DRX long cycle is longer than the DRX short cycle. Both the DRX short cycle and the DRX long cycle belong to the DRX cycle configured for the DRX group.

Generally, the DRX short cycle is an optional configuration. The DRX short cycle is configured for the user equipment. The user equipment may start the DRX short cycle timer (Drx-ShortCycleTimer) when using the DRX short cycle. When the DRX short cycle timer expires, it may switch to the DRX long cycle. At this time, the DRX short cycle timer is equivalent to limiting the action time range of the DRX short cycle.

The DRX group for the first frequency band may be a DRX group belonging to the frequency band range FR2. The DRX group for the second frequency band may be a DRX group belonging to a Frequency Range (FR) 1. FR2 is higher than FR1. For example, FR1 may be: 450 MHz-6000 MHz, and FR2 may be: 24250 MHz-52600 MHz.

In an example, the method further includes:
  according to the DRX short cycle parameter of the DRX group for the first frequency band and/or the DRX group for the second frequency band configured by the base station, determining that the DRX short cycle timer duration of the DRX group for the first frequency band is less than or equal to the DRX short cycle timer duration of the DRX group for the second frequency band;
  and/or,
  determining that a DRX short cycle of the DRX group for the first frequency band is greater than or equal to a DRX short cycle of the DRX group for the second frequency band.

Because the DRX group for the first frequency band of the high frequency band have a higher data transmission rate than the DRX group for the second frequency band of the low frequency band, the time required to transmit the same data is shorter, and the time required for the DRX group for the first frequency band to monitor the PDCCH is shorter. Therefore, the monitoring duration when the DRX group for the first frequency band is in the DRX short cycle may be configured to be less than or equal to the monitoring duration when the DRX group for the second frequency band is in the DRX short cycle.

For the DRX short cycle timer, as shown in FIG. 4, when the DRX short cycle timer times out, the effective DRX cycle is switched from the DRX short cycle to the DRX long cycle. If the duration of the duration timer is the same in the DRX short cycle and the DRX long cycle, the duration of the duration timer occupies a small proportion of the time in the DRX long cycle, and the duration of the duration timer occupies a large proportion of the time in the DRX short cycle. The duration time of the DRX short cycle can be reduced by reducing the duration of the DRX short cycle timer, thereby reducing the monitoring duration when the DRX group is in the DRX short cycle. The user equipment may determine the duration of the DRX short cycle timer according to the DRX short cycle parameter, and set the DRX short cycle timer for the DRX short cycle according to the duration of the DRX short cycle timer.

The DRX short cycle of the DRX group for the first frequency band and the DRX group for the second frequency band may be the same or different, and the duration of the DRX short cycle timer of the DRX group for the first frequency band may be configured to be less than or equal to the duration of the DRX short cycle of the DRX group for the second frequency band.

Exemplarily, if the DRX short cycles of the DRX group for the first frequency band and the DRX group for the second frequency band are both 20 ms, the duration of the DRX short cycle timer of the DRX group for the second frequency band may be configured to be 20 ms*6, and the duration of the DRX short cycle timer of the DRX group for the first frequency band may be configured to be 20 ms*4.

Exemplarily, if the DRX short cycle of the DRX group for the second frequency band is 20 ms, and the DRX short cycle of the DRX group for the first frequency band is 40 ms; then the duration of the DRX short cycle timer of the DRX group for the second frequency band may be configured to be 20 ms*6, and the duration of the DRX short cycle timer of the DRX group for the first frequency band may be configured to be 40 ms*3 or 40 ms*1; in this way, the duration of the DRX short cycle timer of the DRX group for the first frequency band is not longer than that of the DRX group for the second frequency band.

In this way, the duration of the DRX short cycle timer of the DRX group for the first frequency band is less than or equal to the duration of the DRX short cycle timer of the DRX group for the second frequency band, so that the number of DRX short cycles of the DRX group for the first frequency band within the duration of the DRX short cycle timer is less than or equal to the number of DRX short cycles of the DRX group for the second frequency band within the duration of the DRX short cycle timer, thereby reducing the duration time of the DRX short cycle in which the monitoring duration of the DRX group for the first frequency band accounts for a relatively large proportion, and thus saving power consumption of the user equipment.

For the DRX short cycle, as shown in FIG. 4, when the DRX short cycle of the DRX group increases, the number of the DRX short cycle within the same time period decreases, and the monitoring duration of the DRX group decreases. Therefore, the DRX short cycle of the DRX group for the first frequency band may be set to be greater than or equal to the DRX short cycle of the DRX group for the second frequency band. The user equipment may determine the DRX short cycle according to the DRX short cycle parameter.

When the DRX short cycle of the DRX group for the first frequency band is greater than or equal to the DRX short cycle of the DRX group for the second frequency band, the number of DRX short cycles of the DRX group for the first frequency band is less than or equal to that of the DRX short cycles of the DRX group for the second frequency band in the same time period.

In this way, in the first aspect, different DRX short cycle parameters are set for different frequency bands of the DRX group, which improves the flexibility of setting the DRX short cycle parameters. In the second aspect, by configuring a shorter DRX short cycle timer duration for the high-frequency band DRX group, the duration time of the DRX short cycle with a relatively large monitoring duration is reduced. In the third aspect, by configuring a relatively large DRX short cycle for high-frequency band DRX group, the proportion of the monitoring duration in the DRX short cycle is reduced; and by configuring the DRX short cycle parameters from multiple aspects, the PDCCH monitoring duration of high-frequency band DRX group is reduced and power of the user equipment is saved.

In an example, step 201 includes: obtaining the DRX short cycle parameter of the DRX group for the second frequency band configured by the base station; and the method further includes: determining, according to the DRX short cycle parameter, that the DRX group for the second frequency band is configured with the DRX short cycle.

Here, the base station may configure the DRX short cycle only for the DRX group for the second frequency band. The duration of the duration timer occupies a larger proportion of the time in the DRX short cycle than in the DRX long cycle. Therefore, the DRX short cycle may not be configured for the DRX group for the first frequency band, which can reduce the time proportion occupied by the duration timer in the entire time domain, thereby reducing the PDCCH monitoring duration of the DRX group for the first frequency band, and thus saving power of the user equipment. The user equipment may determine, according to the DRX short cycle parameter, not to configure the DRX short cycle for the DRX group for the first frequency band.

In this way, the DRX short cycle is not configured for high-frequency band DRX group, and the number of DRX short cycles with a relatively large monitoring duration is reduced; the PDCCH monitoring duration of high-frequency band DRX group is reduced, and power of the user equipment is saved.

In an example, the duration of the DRX short cycle timer of the DRX group for the first frequency band may be configured to be less than or equal to the duration of the DRX short cycle timer of the DRX group for the second frequency band; and at the same time, the DRX short cycle of the DRX group for the first frequency band may be configured to be greater than or equal to the DRX short cycle of the DRX group for the second frequency band.

In this way, while reducing the duration of the DRX short cycle in which the monitoring duration accounts for a relatively large proportion, the proportion of the monitoring duration in the DRX short cycle can be reduced.

In an example, determining that the DRX short cycle of the DRX group for the first frequency band is greater than or equal to the DRX short cycle of the DRX group for the second frequency band, includes:
determining that the DRX short cycle of the DRX group for the first frequency band is N times the DRX short cycle of the DRX group for the second frequency band, where N is a positive integer greater than or equal to 1.

For example, the base station may configure the DRX short cycle of the DRX group for the first frequency band to be an integer multiple of the DRX short cycle of the DRX group for the second frequency band. The user equipment may determine the DRX short cycle of the DRX group for the first frequency band and the DRX short cycle of the DRX group for the second frequency band according to the DRX short cycle parameter, and configure the DRX short cycle of the DRX group for the first frequency band to be an integer multiple of the DRX short cycle of the DRX group for the second frequency band.

Exemplarily, if the DRX short cycle of the DRX group for the second frequency band is 20 ms, the DRX short cycle of the DRX group for the first frequency band may be configured to be 40 ms.

In this way, if the duration of the duration timer is the same, the monitoring duration of the DRX group for the first frequency band is less than or equal to the monitoring duration of the DRX group for the second frequency band in the same time period. In this way, the monitoring duration of the PDCCH of the high-frequency band DRX group is reduced, and the power of the user equipment is saved.

In an example, the method further includes at least one of the following:
according to the received first medium access control control unit (MAC CE), determining that the DRX group for the first frequency band and the DRX group for the second frequency band enter the DRX short cycle or enter the DRX long cycle at the same time; and
according to the received second MAC CE, determining that the DRX group for the second frequency band enters the DRX short cycle, and determining that the DRX group for the first frequency band enters the DRX long cycle.

The base station may send a MAC CE through an RRC connection or the like to instruct the user equipment to enter the DRX short cycle or the DRX long cycle.

The first MAC CE may be a CE that acts on both the DRX group for the first frequency band and the DRX group for the second frequency band. When the user equipment receives the first MAC CE, it may switch the DRX group for the first frequency band and the DRX group for the second frequency band to the DRX short cycle at the same time, or switch the DRX group for the first frequency band and the DRX group for the second frequency band to the DRX long cycle at the same time.

The second MAC CE may be a CE that acts on both the DRX group for the first frequency band and the DRX group for the second frequency band. When the user equipment receives the first MAC CE, it may switch the DRX group for the second frequency band to the DRX short cycle, and simultaneously switch the DRX group for the first frequency band to the DRX long cycle.

A specific example is provided below in conjunction with any of the above-mentioned examples.

In the multi-DRX group scenario, for the base station, the monitoring duration indicated by the DRX short cycle parameter of DRX group 2 corresponding to high-frequency band Frequency Range (FR) 2 is not longer than the monitoring duration indicated by the DRX short cycle parameter of DRX group 1 corresponding to low-frequency band FR1.

Here, the monitoring duration indicated by the DRX short cycle parameter of the DRX group 2 being not longer than the monitoring duration indicated by the DRX short cycle parameter of the DRX group 1 corresponding to the low-frequency band FR1 may include: configuring the duration of the DRX short cycle timer (drxShortCycleTimer) of the DRX group 2 to be not longer than the duration of DRXdrxShortCycleTimer of DRX group 1.

As an example, if the durations of DRX short cycles (shortDRX-Cycle) of DRX group 1 and DRX group 2 are the same, the drxShortCycleTimer of the DRX short cycle of DRX group 2 may be configured not to be greater than the drxShortCycleTimer of DRX group 1. For example, if the period of the DRX short cycle is 20 ms, it may be configured that drxShortCycleTimer of DRX group 1=20 ms*6 and drxShortCycleTimer of DRX group 2=20 ms*4.

As an example, if the shortDRX-Cycles of DRX group 1 and DRX group 2 are different, the drxShortCycleTimer of DRX group 2 may be configured not to be greater than the drxShortCycleTimer of DRX group 1. For example, if the DRX short cycle of DRX group 1 is 20 ms, and the short cycle of DRX group 2 is 40 ms, it may be configured that drxShortCycleTimer of DRX group 1=20 ms*6, and drxShortCycleTimer of DRX group 2=40 ms*3 or 40 ms*1.

Here, the monitoring duration indicated by the DRX short cycle parameter of the DRX group 2 is not longer than the monitoring duration indicated by the DRX short cycle parameter of the DRX group 1 corresponding to the low-frequency band FR1, which may include: the shortDRX-Cycle of the DRX group 2 may be an integer multiple of shortDRX-Cycle of the DRX group 1. For example, if the shortDRX-Cycle of DRX group 1 is 20 ms, the shortDRX-Cycle of DRX group 2 may be configured to be 40 ms.

It is also possible not to configure the DRX short cycle for the DRX group 2 corresponding to the high-frequency band FR2; and the DRX group 2 only has a long cycle.

The base station may send an MAC CE to instruct the user equipment to switch the DRX short cycle or the DRX long cycle. The MAC CE may be an MAC CE common to DRX group 1 and DRX group 2. If the MAC CE is received, the user equipment controls the DRX group 1 and the DRX group 2 to enter the DRX short cycle or the DRX long cycle at the same time. If the MAC CE is received, the user equipment control may also control the DRX group 1 to enter the DRX short cycle, and control the DRX group 2 to only enter the DRX long cycle.

Figure 6:
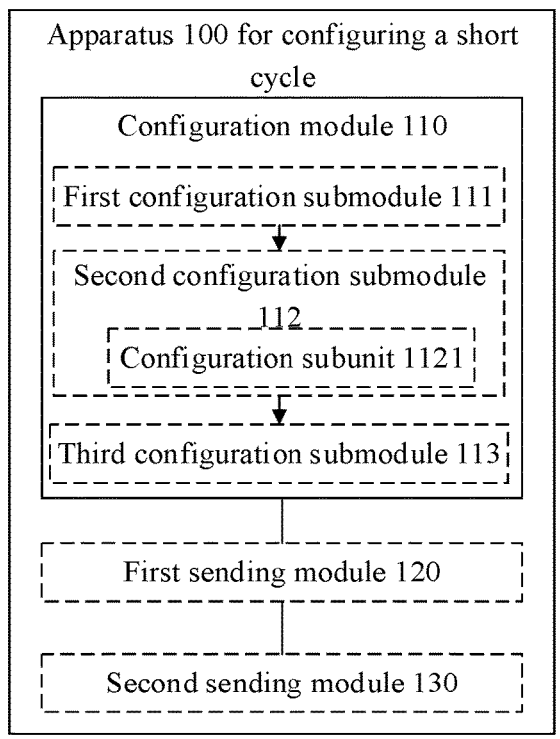
FIG. 6 is a structural block diagram showing an apparatus for configuring a short cycle according to an example.

An example of the present disclosure further provides an apparatus for configuring a short cycle, which is applied to a base station of wireless communication. FIG. 6 is a schematic structural diagram of an apparatus 100 for configuring a short cycle provided by an example of the present disclosure. As shown in FIG. 6, the apparatus 100 includes: a configuration module 110.

The configuration module 110 is configured to configure a DRX short cycle parameter of a DRX group for a first frequency band and/or a DRX group for a second frequency band for a plurality of discontinuous reception (DRX) groups of the user equipment.

The frequency of the first frequency band is higher than the frequency of the second frequency band.

In an example, the configuration module 110 includes at least one of the following:
  a first configuration submodule 111, configured to configure a DRX short cycle timer duration of the DRX group for the first frequency band to be less than or equal to a DRX short cycle timer duration of the DRX group for the second frequency band;
  and/or,
  a second configuration submodule 112, configured to configure a DRX short cycle of the DRX group for the first frequency band to be greater than or equal to a DRX short cycle of the DRX group for the second frequency band.

In an example, the configuration module 110 includes:
  a third configuration submodule 113, configured to configure a DRX short cycle for the DRX group for the second frequency band.

In an example, the second configuration submodule 112 includes:
  a configuration subunit 1121, configured to configure the DRX short cycle of the DRX group for the first frequency band to be N times the DRX short cycle of the DRX group for the second frequency band, where N is a positive integer greater than or equal to 1.

In an example, the apparatus 100 further includes at least one of the following:
  a first sending module 120, configured to send a first medium access control control unit (MAC CE), where the first MAC CE is used to instruct the DRX group for the first frequency band and the DRX group for the second frequency band to enter a DRX short cycle or enter a DRX long cycle at the same time; and
  a second sending module 130, configured to send a second MAC CE, where the second MAC CE is used to instruct the DRX group for the second frequency band to enter the DRX short cycle, and the DRX group for the first frequency band to enter the DRX long cycle.

Figure 7:
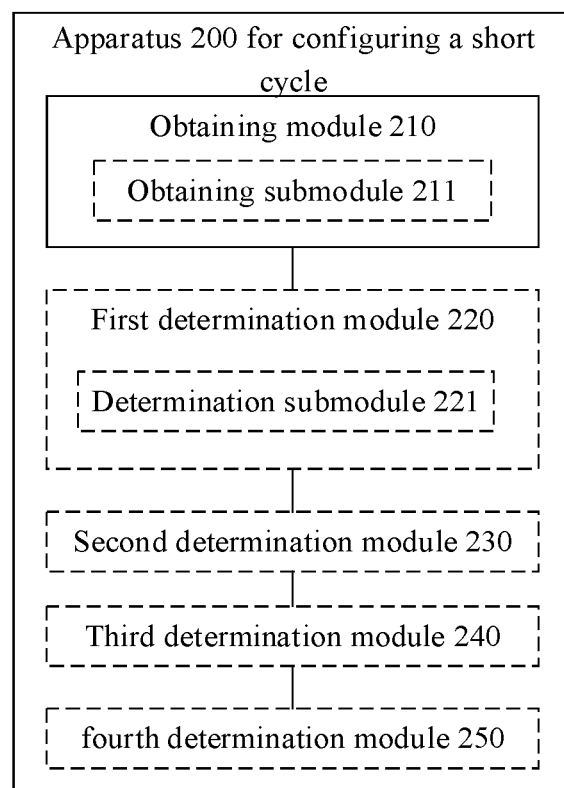
FIG. 7 is a structural block diagram showing another apparatus for configuring a short cycle according to an example.

An example of the present disclosure further provides an apparatus for configuring a short cycle, which is applied to a user equipment of wireless communication. FIG. 7 is a schematic structural diagram of an apparatus 200 for configuring a short cycle provided by the example of the present disclosure. As shown in FIG. 7, the apparatus 200 includes: an obtaining module 210.

The obtaining module 210 is configured to obtain a DRX short cycle parameter of a DRX group for a first frequency band and/or a DRX group for a second frequency band configured by a base station.

The frequency of the first frequency band is higher than the frequency of the second frequency band.

In an example, the apparatus 200 further includes:
  a first determination module 220, configured to, according to the DRX short cycle parameter of the DRX group for the first frequency band and/or the DRX group for the second frequency band configured by the base station, determine that a DRX short cycle timer duration of the DRX group for the first frequency band is less than or equal to a DRX short cycle timer duration of the DRX group for the second frequency band;
  and/or,
  determine that a DRX short cycle of the DRX group for the first frequency band is greater than or equal to a DRX short cycle of the DRX group for the second frequency band.

In an example, the obtaining module 210 includes:
  an obtaining submodule 211, configured to obtain the DRX short cycle parameter of the DRX group for the second frequency band configured by the base station; and
  the apparatus 200 also includes:
  a second determination module 230, configured to determine, according to the DRX short cycle parameter, that the DRX group for the second frequency band is configured with a DRX short cycle.

In an example, the first determination module 220 includes:
  a determination submodule 221, configured to determine that the DRX short cycle of the DRX group for the first frequency band is N times the DRX short cycle of the DRX group for the second frequency band, where N is a positive integer greater than or equal to 1.

In an example, the apparatus 200 further includes at least one of the following:

a third determination module 240, configured to, according to a received first medium access control control unit (MAC CE), determine that the DRX group for the first frequency band and the DRX group for the second frequency band simultaneously enter the DRX short cycle or simultaneously enter the DRX long cycle; and a fourth determination module 250, configured to determine that the DRX group for the second frequency band enters the DRX short cycle, and determine that the DRX group for the first frequency band enters the DRX long cycle according to a received sent second MAC CE.

In an example, the configuration module 110, the first sending module 120, the second sending module 130, the obtaining module 210, the first determination module 220, the second determination module 23, the third determination module 240 and the fourth determination module 250 etc. may be implemented by one or more Central Processing Units (CPUs), Graphics Processing Units (GPUs), baseband processors (BPs), Application Specific Integrated Circuits (ASICs), DSPs, Programmable Logic Devices (PLDs), Complex Programmable Logic Devices (CPLDs), Field-Programmable Gate Arrays (FPGAs), general-purpose processors, controllers, Micro Controller Units (MCUs), Microprocessors, or other electronic components for performing the aforementioned methods.

Figure 8:
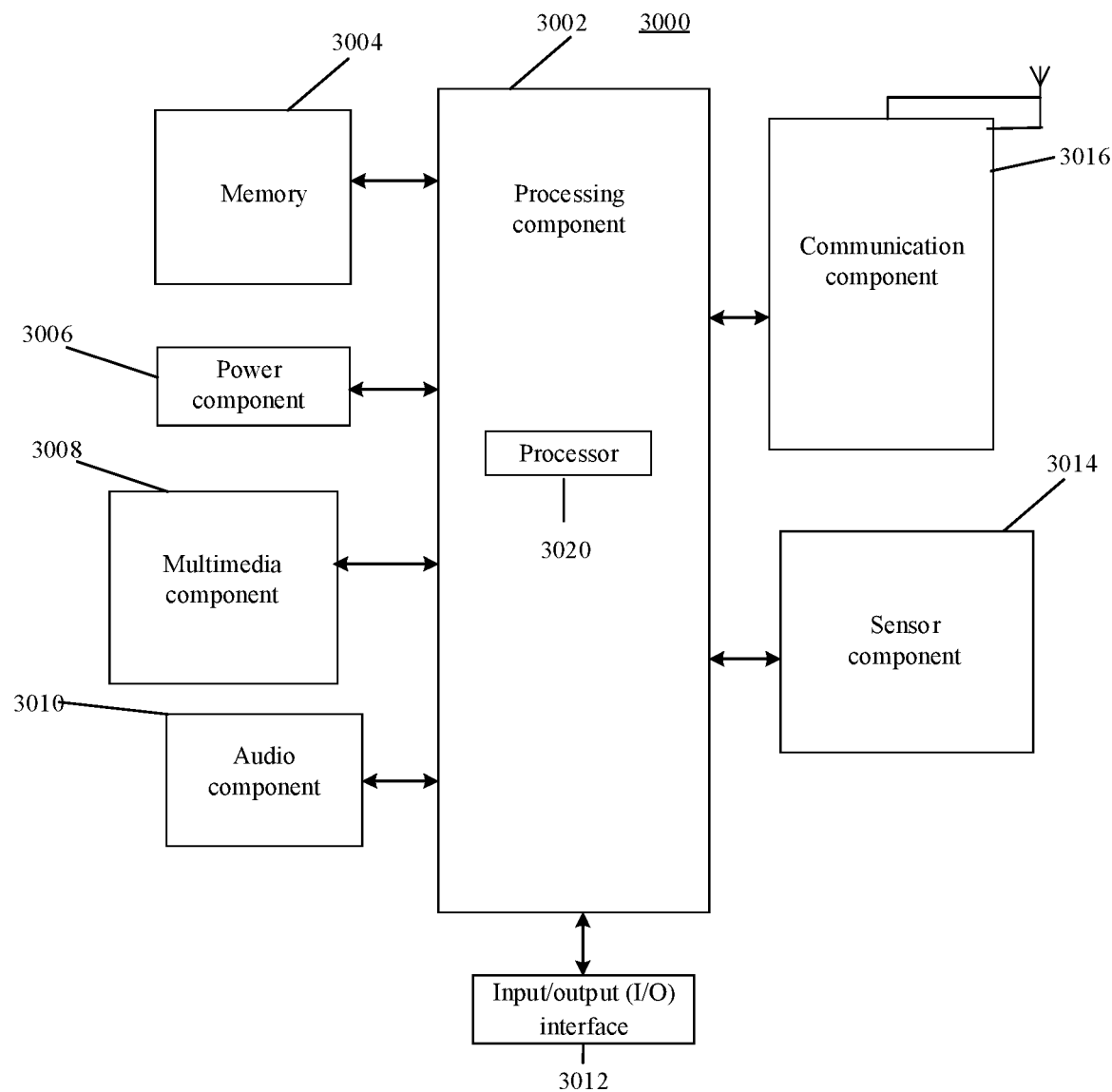
FIG. 8 is a block diagram of an apparatus for configuring or determining a short cycle according to an example.

FIG. 8 is a block diagram of an apparatus 3000 for configuring a short cycle or determining a transmission block configuration parameter according to an example. For example, the apparatus 3000 may be a mobile phone, a computer, a digital broadcast terminal, a messaging apparatus, a gaming console, a tablet, a medical apparatus, exercise equipment, a personal digital assistant, etc.

Referring to FIG. 8, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, video, etc. The memory 3004 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 3008 includes a front camera and/or a rear camera. The front camera and the rear camera may receive an external multimedia datum while the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some examples, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or a component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some examples, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other apparatus. The apparatus 3000 may access a wireless network based on a communication standard, such as WiFi, 2G, or 3G, or a combination thereof. In one example, the communication component 3016 receives a broadcast signal or broadcast associated information from an external broadcast management system via a broadcast channel. In one example, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 3000 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In examples, there is also provided a non-transitory computer-readable storage medium including instructions, such as the memory 3004 including instructions, the above instructions may be executed by the processor 3020 in the apparatus 3000 for performing the above-described methods. For example, the non-transitory computer-readable storage medium may be a ROM, a Random Access Memory (RAM), a CD-ROM, a magnetic tape, a floppy disc, an optical data storage device, and the like.

In the method and apparatus for configuring a short cycle, the communication device, and the storage medium provided by the examples of the present disclosure, the base station configures the DRX short cycle parameter of the DRX group for the first frequency band and/or the DRX group for the second frequency band for a plurality of DRX groups of the user equipment; and different DRX short cycle parameters are set for the DRX groups of different frequency bands, which improves the flexibility of setting of the DRX short cycle parameter.

Other examples of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and examples are considered as exemplary only.

It will be appreciated that the present disclosure is not limited to the exact construction that has been described above and illustrated in the accompanying drawings, and that various modifications and changes may be made without departing from the scope thereof.

What is claimed is:

1. A method for configuring a short cycle, comprising:
   for a plurality of discontinuous reception (DRX) groups of a user equipment, configuring, by a base station, a DRX short cycle parameter of a DRX group for a first frequency band and a DRX group for a second frequency band, wherein a frequency of the first frequency band is higher than a frequency of the second frequency band; and
   sending a medium access control control unit (MAC CE), wherein the MAC CE is configured to instruct the DRX group for the first frequency band and the DRX group for the second frequency band to simultaneously enter a DRX short cycle and simultaneously enter a DRX long cycle, or
   sending a MAC CE, wherein the MAC CE is configured to instruct the DRX group for the second frequency band to enter the DRX short cycle, and the DRX group for the first frequency band to enter the DRX long cycle.

2. The method according to claim 1, wherein configuring the DRX short cycle parameter of the DRX group for the first frequency band and the DRX group for the second frequency band comprises at least one of following steps:
   configuring a DRX short cycle timer duration of the DRX group for the first frequency band to be less than or equal to a DRX short cycle timer duration of the DRX group for the second frequency band; or
   configuring a DRX short cycle of the DRX group for the first frequency band to be greater than or equal to a DRX short cycle of the DRX group for the second frequency band.

3. The method according to claim 1, wherein configuring the DRX short cycle parameter of the DRX group for the first frequency band and the DRX group for the second frequency band comprises:
   configuring a DRX short cycle for the DRX group for the second frequency band.

4. The method according to claim 2, wherein configuring the DRX short cycle of the DRX group for the first frequency band to be greater than or equal to the DRX short cycle of the DRX group for the second frequency band, comprises:
   configuring the DRX short cycle of the DRX group for the first frequency band to be N times the DRX short cycle of the DRX group for the second frequency band, wherein N is a positive integer greater than or equal to 1.

5. A method for configuring a short cycle, comprising:
   obtaining, by a user equipment, a discontinuous reception (DRX) short cycle parameter of a DRX group for a first frequency band and a DRX group for a second frequency band configured by a base station, wherein a frequency of the first frequency band is higher than a frequency of the second frequency band; and
   determining that the DRX group for the first frequency band and the DRX group for the second frequency band simultaneously enter a DRX short cycle and simultaneously enter a DRX long cycle according to a received-first medium access control control unit (MAC CE), or
   determining that the DRX group for the second frequency band enters the DRX short cycle, and determining that the DRX group for the first frequency band enters the DRX long cycle according to the received MAC CE.

6. The method according to claim 5, wherein the method further comprises:
   perform at least one of following actions according to the DRX short cycle parameter of the DRX group for the first frequency band and the DRX group for the second frequency band configured by the base station:
   determining that a DRX short cycle timer duration of the DRX group for the first frequency band is less than or equal to a DRX short cycle timer duration of the DRX group for the second frequency band; or
   determining that a DRX short cycle of the DRX group for the first frequency band is greater than or equal to a DRX short cycle of the DRX group for the second frequency band.

7. The method according to claim 5, wherein obtaining the DRX short cycle parameter of the DRX group for the first frequency band and the DRX group for the second frequency band configured by the base station comprises:
   obtaining the DRX short cycle parameter of the DRX group for the second frequency band configured by the base station; and wherein the method further comprises:
according to the DRX short cycle parameter, determining that the DRX group for the second frequency band is configured with a DRX short cycle.

8. The method according to claim 6, wherein determining that the DRX short cycle of the DRX group for the first frequency band is greater than or equal to the DRX short cycle of the DRX group for the second frequency band, comprises:
determining that the DRX short cycle of the DRX group for the first frequency band is N times the DRX short cycle of the DRX group for the second frequency band, wherein N is a positive integer greater than or equal to 1.

9. An apparatus for configuring a short cycle, applied to a base station, wherein the apparatus comprises: a processor, a transceiver, a memory, and an executable program stored on the memory and capable of being run by the processor, wherein the processor, when running the executable program, executes:
for a plurality of discontinuous reception (DRX) groups of a user equipment, configure a DRX short cycle parameter of a DRX group for a first frequency band and a DRX group for a second frequency band, wherein a frequency of the first frequency band is higher than a frequency of the second frequency band; and
send a medium access control control unit (MAC CE), wherein the MAC CE is configured to instruct the DRX group for the first frequency band and the DRX group for the second frequency band to simultaneously enter a DRX short cycle and simultaneously enter a DRX long cycle, or
send a MAC CE, wherein the MAC CE is configured to instruct the DRX group for the second frequency band to enter the DRX short cycle, and the DRX group for the first frequency band to enter the DRX long cycle.

10. The apparatus according to claim 9, wherein the processor is further configured to perform at least one of following steps:
configure a DRX short cycle timer duration of the DRX group for the first frequency band to be less than or equal to a DRX short cycle timer duration of the DRX group for the second frequency band; or
configure a DRX short cycle of the DRX group for the first frequency band to be greater than or equal to a DRX short cycle of the DRX group for the second frequency band.

11. The apparatus according to claim 9, wherein the processor is further configured to:
configure a DRX short cycle for the DRX group for the second frequency band.

12. The apparatus according to claim 10, wherein the processor is further configured to:
configure the DRX short cycle of the DRX group for the first frequency band to be N times the DRX short cycle of the DRX group for the second frequency band, wherein N is a positive integer greater than or equal to 1.

13. An apparatus for configuring a short cycle, applied to a user equipment, wherein the apparatus comprises: a processor, a transceiver, a memory, and an executable program stored on the memory and capable of being run by the processor, wherein the processor, when running the executable program, executes the method for configuring a short cycle according to claim 5.

14. The apparatus according to claim 13, wherein the processor is further configured to perform at least one of following actions according to the DRX short cycle parameter of the DRX group for the first frequency band and the DRX group for the second frequency band configured by the base station:
determine that a DRX short cycle timer duration of the DRX group for the first frequency band is less than or equal to a DRX short cycle timer duration of the DRX group for the second frequency band; or
determine that a DRX short cycle of the DRX group for the first frequency band is greater than or equal to a DRX short cycle of the DRX group for the second frequency band.

15. The apparatus according to claim 13, wherein the processor is further configured to:
obtain the DRX short cycle parameter of the DRX group for the second frequency band configured by the base station; and
determine that the DRX group for the second frequency band is configured with a DRX short cycle according to the DRX short cycle parameter.

16. The apparatus according to claim 14, wherein the processor is further configured to:
determine that the DRX short cycle of the DRX group for the first frequency band is N times the DRX short cycle of the DRX group for the second frequency band, wherein N is a positive integer greater than or equal to 1.

* * * * *